United States Patent [19]
Pettigrew et al.

[11] Patent Number: 5,149,211
[45] Date of Patent: Sep. 22, 1992

[54] PRINTERS AND ANCILLARY SYSTEMS

[76] Inventors: Robert M. Pettigrew, Pound Cottage, High Street, Foxton, Cambridgeshire; Alan J. Harry, 2 The Lawns, Melbourn, Royston, Hertfordshire SG8 6BA; Paul R. Nailor, 82b Queen's Drive, Finsbury Park, London N4, all of United Kingdom; Fred Adelmann, Pestalozzistrasse 7, 6930 Eberbach am Neckar, Fed. Rep. of Germany; Peter Franzen, Ersheimer Strasse 9, 6932 Hirschhorn am Neckar, Fed. Rep. of Germany; Juergen Schoon, Tannenhalde 6, 6930 Eberbach am Neckar, Fed. Rep. of Germany

[21] Appl. No.: 594,372

[22] Filed: Oct. 9, 1990

Related U.S. Application Data

[63] Continuation of Ser. No. 286,658, Dec. 19, 1988, abandoned.

[30] Foreign Application Priority Data

Aug. 12, 1988 [GB] United Kingdom ............... 8819174

[51] Int. Cl.$^5$ ................................................. B41J 3/39
[52] U.S. Cl. ................................. 400/88; 400/86; 156/384; 340/706
[58] Field of Search ............. 400/86, 88, 120; 101/288; 340/706-712, 700; 341/20-22; 156/384

[56] References Cited

U.S. PATENT DOCUMENTS

| | | | |
|---|---|---|---|
| 3,880,078 | 4/1975 | Pelet | 101/288 |
| 4,284,004 | 8/1981 | Sato | 400/88 |
| 4,652,317 | 3/1987 | Seestrom | 156/384 |
| 4,765,765 | 8/1988 | Futakata | 101/288 |
| 4,846,924 | 7/1989 | Morrison | 156/384 |
| 4,857,121 | 8/1989 | Markley | 156/384 |
| 4,868,780 | 9/1989 | Stern | 340/709 |
| 4,952,932 | 8/1990 | Sugino | 340/712 |

FOREIGN PATENT DOCUMENTS

| | | | |
|---|---|---|---|
| 0027886 | 5/1981 | European Pat. Off. | 400/120 |
| 0074719 | 3/1983 | European Pat. Off. | 400/88 |
| 0132471 | 2/1985 | European Pat. Off. | 101/288 |
| 0173996 | 3/1986 | European Pat. Off. | 400/61 |
| 0184682 | 6/1986 | European Pat. Off. | 400/61 |
| 0208203 | 1/1987 | European Pat. Off. | 400/88 |
| 0209752 | 1/1987 | European Pat. Off. | 400/88 |
| 89390 | 5/1985 | Japan | 400/88 |
| 59207263 | 1/1987 | Japan | 400/692 |
| 8304118 | 11/1983 | PCT Int'l Appl. | 400/88 |
| 2061830 | 5/1981 | United Kingdom | 400/88 |
| 2192076 | 12/1987 | United Kingdom | 400/692 |

OTHER PUBLICATIONS

I.B.M. Technical Disclosure Bulletin vol. 22, No. 7, Dec. 1979.

*Primary Examiner*—David A. Wiecking
*Assistant Examiner*—Steven S. Kelley
*Attorney, Agent, or Firm*—Poms, Smith, Lande & Rose

[57] ABSTRACT

Improved printers are disclosed which are characterized by means for inputting data which is arranged to function without the use of an alpha-numeric keyboard. The data inputting means may be a cursor moving device operating in conjunction with a graphics display system; a graphics display system having a touch-sensitive screen; a speech recognition unit; a memory or "smart card"; or an integral bar code reader. The cursor moving devices may be, for example, a tracker ball or a mouse.

9 Claims, 6 Drawing Sheets

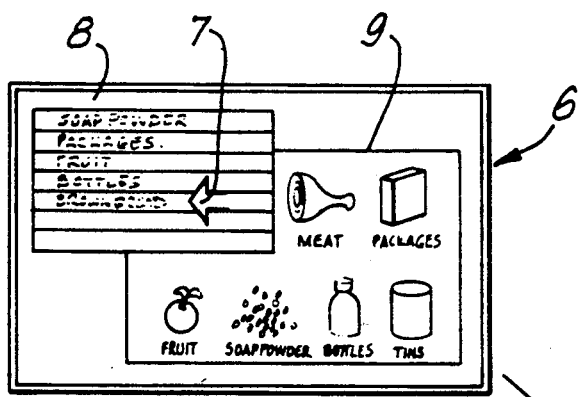
Fig.1.
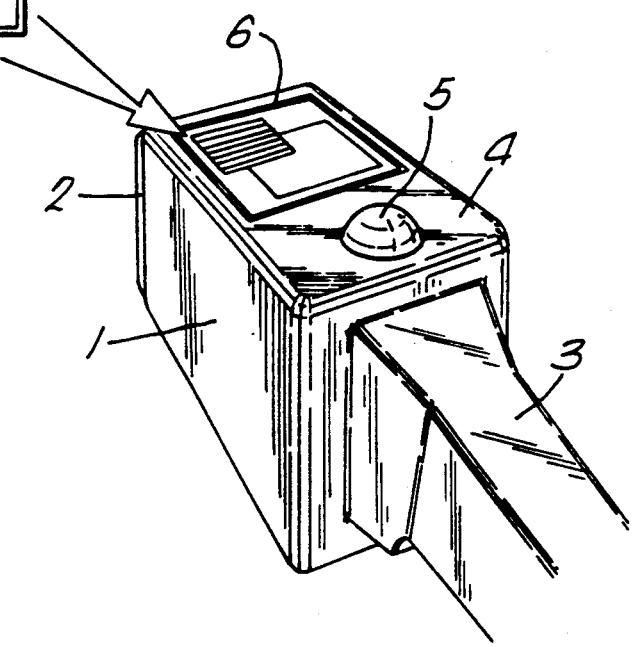
Fig.2.
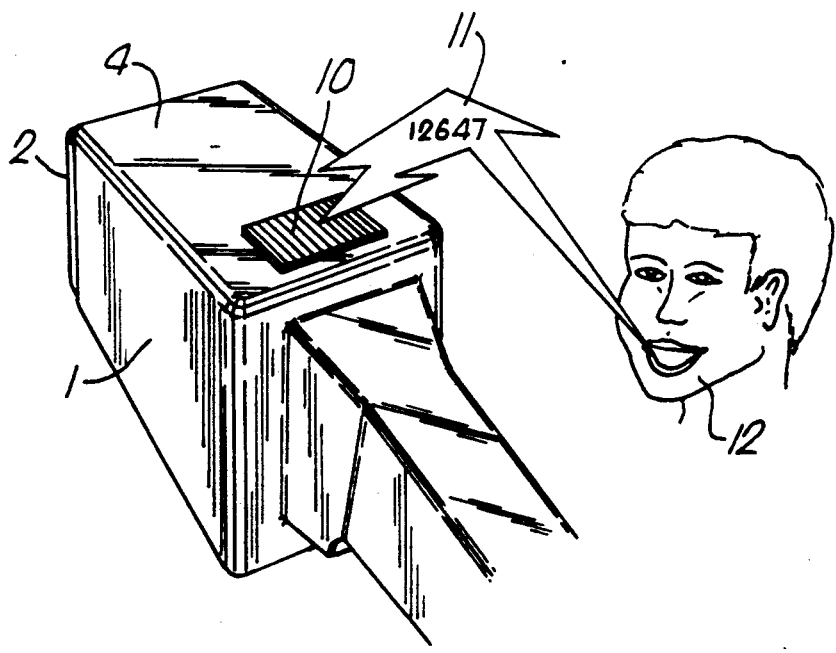

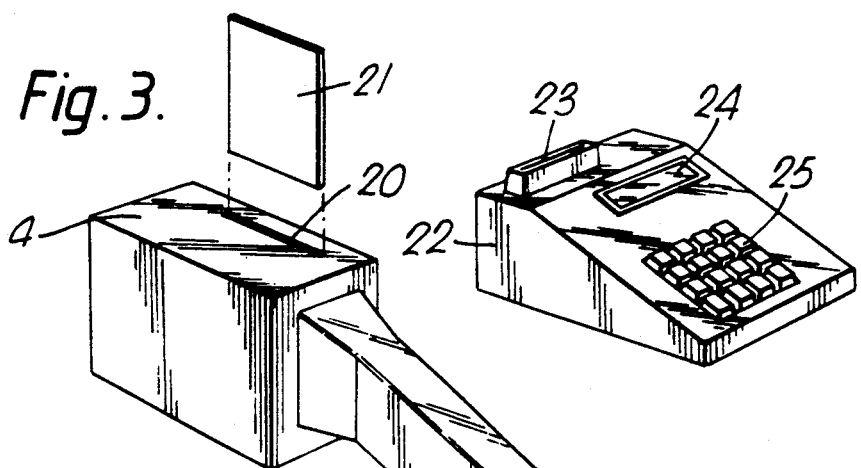
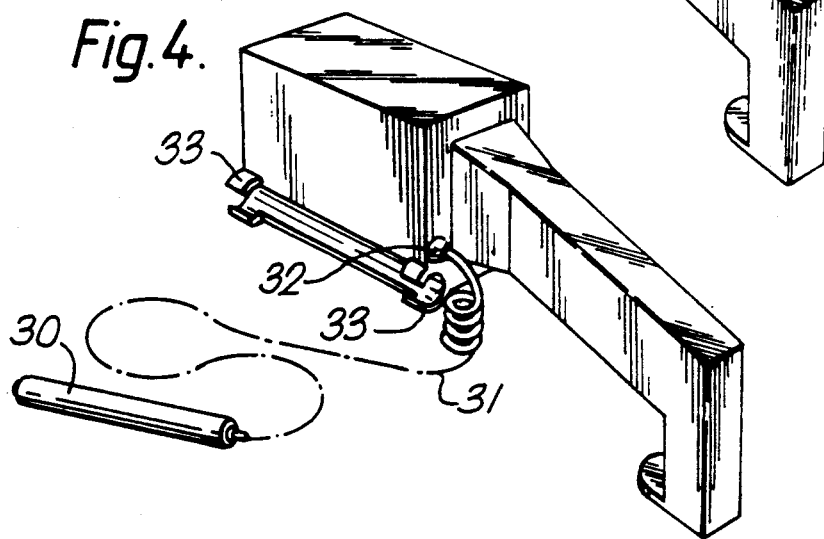
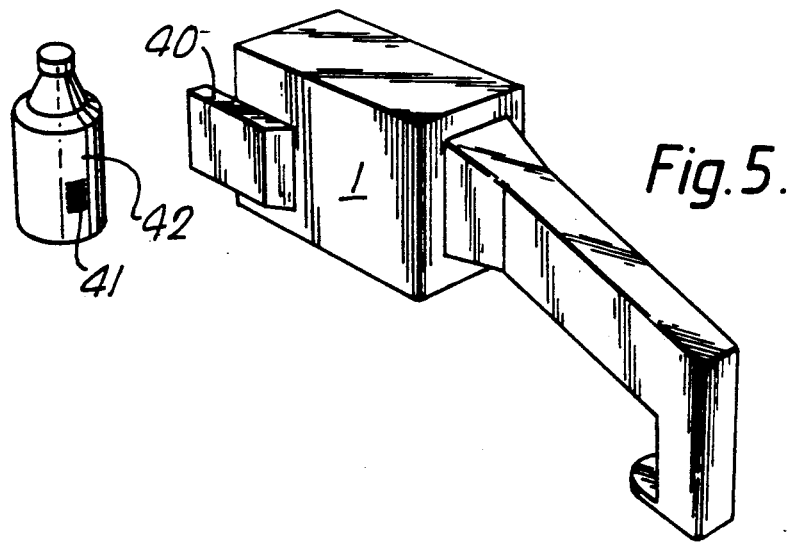

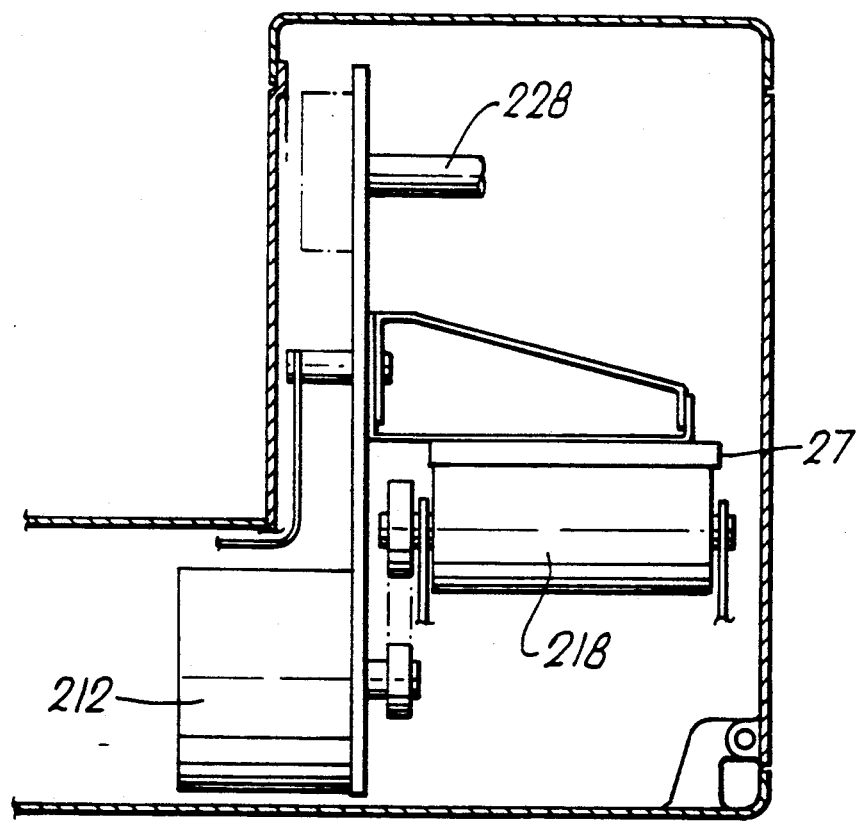

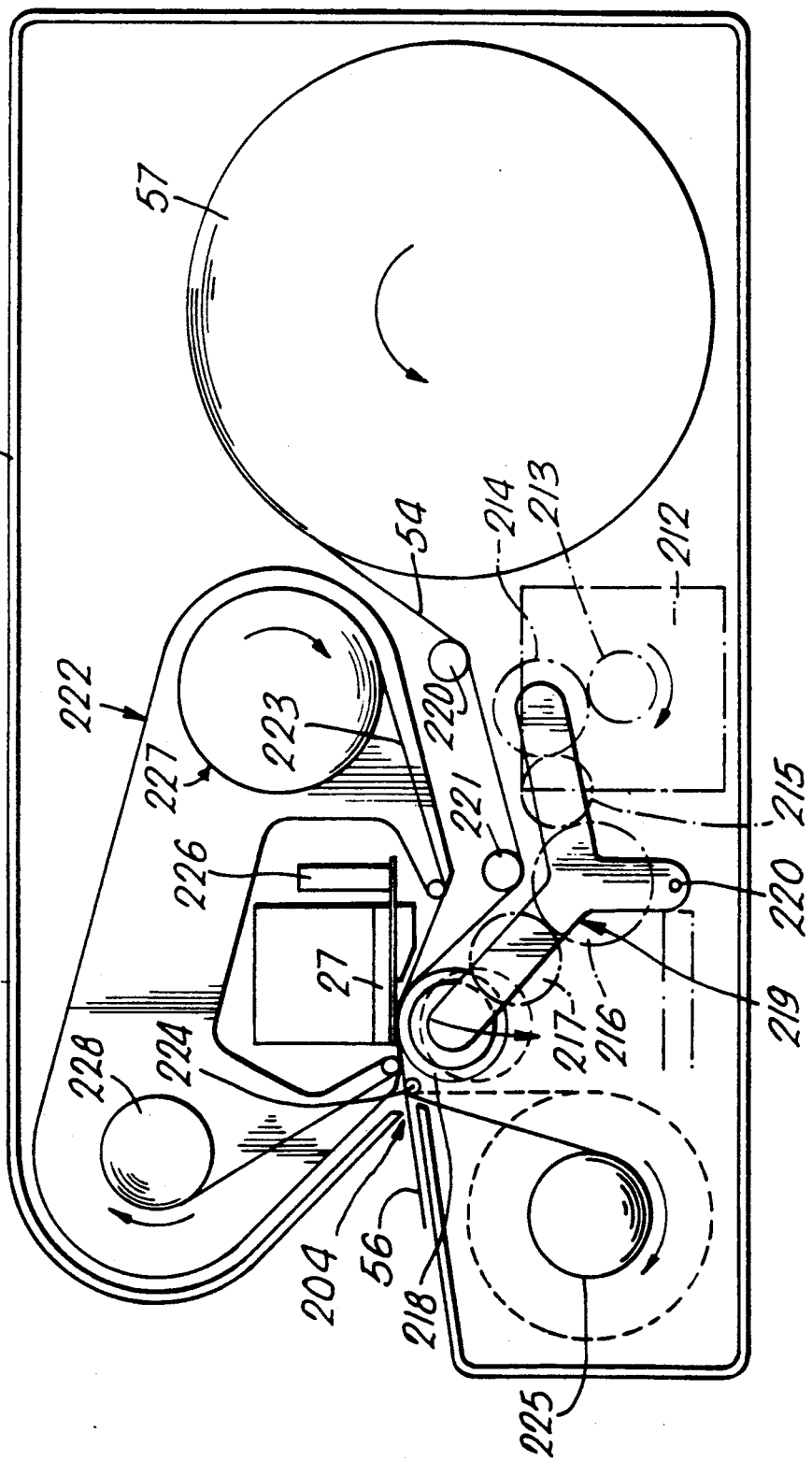

PRINTERS AND ANCILLARY SYSTEMS

This is a continuation of copending application Ser. No. 286,658, filed on Dec. 19, 1988, now abandoned.

This invention relates to printers and ancillary systems for use therewith.

Bar codes are now widely used for ready identification and tracking of products, samples and documents. For example, they are finding increasing uses in medical, pharmaceutical and research centres as well as in retail areas. Bar codes are now widely used at goods-in and check-out locations associated, for example, with retail trading. They facilitate the use of fully automatic in-and-out systems and, in some instances, do away with the need for price labels on the products. Many supermarkets stock 25,000 to 30,000 items for sale, however, and do not have sufficient shelf space to allocate all of these items to a particular position; as a result, even if there is a bar code on such products, there is still a need for price marking. Nevertheless, the use of a bar code scanning system to identify the goods may reduce labour requirements significantly and thus produce considerable savings.

In supermarkets, typically 95-96% of food items going through the check-out have a bar code already printed at source by the manufacturer. For non-food items, the number of products bar coded at source is typically 80-85% of those going through the check-out.

In order to apply price labels to items already carrying a bar code, and to add a bar code to those products which are not coded at source, it is common for a retail outlet to use one or more label printers. These may be hand-held, portable or fixed in position. Typically, three stationary printers may be used by up to ten people. Strips of labels will be printed and taken to the product and either applied by hand or with a dispenser. Some retailers consider that it is more economical for each operative to have his own hand-held bar code label printer.

If a national bar code has been allocated to a given product, this will normally be used by the retailer if no manufacturer's bar code is present. For products where no such national bar code has been allocated, it is up to the retailer to decide on his own bar code number. Typically, this number might be based on the numbering system used by the retailer before the introduction of bar code scanning to his store. In practice, the person generating bar codes with a printer will have with him source material which indicates the nature of the bar code for each product where a label is required. In medical application, bar codes are useful in patient identification, specimen collection and distribution, pharmaceuticals distribution, document tracking, and management applications such as accounting, time recording/allocating, supplies management, and tracking of personnel and documents.

Hand-held labelling machines typically comprise a housing which is supported by a handle. Such a machine may include a label supply roll within said housing; a printing unit; and a keyboard for inputting data. When such a machine is used to print bar code labels, an operative will input the bar code number via the keyboard, and then activates a label feed mechanism and the printing unit to apply the requested bar code to one of the labels on the supply roll. After the bar code has been printed, the label feed mechanism moves the supply roll so that the printed label is accessible for application to the appropriate goods item.

The keyboard of such a printer can constitute a relatively bulky component of the overall printer, and furthermore the use of keyboards by operatives can give rise to errors which, with price code marking, may have serious consequences. It is therefore an object of the present invention to provide a printer which does not require an integral keyboard for inputting data, and which, in preferred embodiments, has increased versatility of operation and is capable of handling more data than conventional portable or hand-held printers.

According to one aspect of the present invention, there is provided a printer which comprises a housing; a printing unit, means for supplying to said printing unit a substrate onto which indicia are to be printed; and means for inputting data to control the nature of the indicia printed at said printing unit, characterised in that said means for inputting data is arranged to function without the use of an alphanumeric keyboard.

The printing unit will usually be an electrically operated unit; in other embodiments, however, the printing unit may be a mechanical print system.

In the present invention, the printers may be constructed and arranged to operate as stationary (fixed) printers, as portable printers or as hand-held printers.

A variety of different means may be adopted for inputting data to a printer in accordance with this invention. Such means include mechanical, optical, electromagnetic, electrostatic, acoustic and ultrasonic devices; in some circumstances, it may be advantageous to employ more than one data input means with a given printer. In one embodiment, the means for inputting data to a printer comprises a cursor moving device operatively coupled to a graphics interface. Examples of cursor moving devices useful in this invention are: a tracker ball; a mouse; and a joystick. Another possible arrangement is to use a rotatable knob carried by a shaft which is capable of axial displacement to permit multifunctional control. Typically, a tracker ball/graphics interface may be part of the printer itself, or it may be in the form of an ancillary unit connected to or connectable with the printer. The tracker ball can be used to identify and select one item from a given menu displayed by the graphics interface, whereby when an appropriate item is selected, data is transferred to the printing unit so as to generate indicia on the substrate which corresponds to the item selected from the graphics interface. In one particular example, the tracker ball/graphics interface unit allows an operative to select items from a series of successively more specialised menus until a particular brand of, for example, tinned baked beans is selected; the tracker ball/graphics unit then transfers data to the printing unit which is encoded to generate indicia, for example a bar code or other information, corresponding to the selected products. The tracker ball/graphics unit may additionally be used to transfer other data which may for example be pre-programmed. Operation of the graphics interface, and transfer of data from the tracker ball/graphics unit to the printing unit of the printer, can conveniently be under microprocessor control. The tracker ball/graphics unit will usually have an actuating device, e.g. a push button, for confirming selection of a given item to which the cursor has been moved in the display.

While the details given above have been in relation to the use of a tracker ball as the cursor moving device, the same arrangements apply equally to other types of cursor moving device.

Instead of a cursor moving device, a graphics display unit having a touch-sensitive screen may be employed.

The graphics interface may also include other display features, for example a dictionary of bar codes, stock items, suppliers, consumer-relevant data and stock control information. As compared with the use of an alpha-numeric keyboard, a unit in accordance with this aspect of the invention may provide greater ease of use and increased reliability in generating the correct printed output from the printer.

In another embodiment, the means for inputting data to the printer comprises a speech recognition unit. In the simplest arrangement, the speech recognition unit is used as means for confirming selection of particular item from the display—e.g. when the cursor is located against that item, so that the speech recognition unit replaces the actuating push button mentioned above. Alternatively, voice input may be used in place of alpha-numeric data from a keyboard for some or all the required functions/actuating steps. Preferably, the voice recognition system is adapted to recognize a limited vocabulary, for example a string of numbers. With such a system, an operative can read off the numerical code corresponding to a given bar code for a product, rather than key in the numerical data via an alpha-numeric keyboard. The voice recognition unit may alternatively be more comprehensive, in that it may be able to recognise speaker independent continuous or staccato speech with an extensive vocabulary.

In a third embodiment, the means for inputting data to the printer comprises a memory card or a "smart card" which is pre-programmed with data. The smart card may be pre-programmed in any suitable way, typically by means of a portable data entry terminal having an alpha-numeric keyboard. Alternatively, the portable data entry terminal may have a bar code directory which in use is interrogated via a light pen.

A data entry terminal (which may be portable) for use with such a memory card or smart card may also contain a modular printing unit, e.g. one containing a thermal transfer head, which may then be inserted into a price-marking gun containing label advancing means. The data entry terminal may be used by itself for printing shelf edge labels, and similar items.

In another mode of operation, a central data entry terminal may be used to print out a list of retail items which do not have a bar code applied by the manufacturers; the unit would then print out a bar code for each such item, which bar code would then be readable by a portable data entry terminal. In this way, the user of the system would use a list of items in conjunction with a printer incorporating a base code reader. In order to input data to the printer, the user would sweep the bar code reader of the printer across the particular bar code displayed on his reference list which would then actuate the printing unit of the printer to generate a bar code label.

A further alternative embodiment involves the use of a plug-in smart card without requiring an alpha-numeric keyboard for its pre-programming. With such an embodiment, the printer would have for example a thumb driven roller which would be used in conjunction with the smart card to instruct the printing unit to produce a bar code as required.

Various other means for inputting data to the printer are available. For example, data input may be provided by electromagnetic radiation, e.g. infra-red, ultra-violet, microwave or radio frequency radiation; by laser; by acoustics; or by ultrasonics. Such data input means may comprise a receiver arranged to function in conjunction with a transmitter device remote from the printer. The receiver may be a built-in receiver or transceiver provided in said printer.

A modification of the above concept merely requires that the printer should include an integral bar code reader. This can be used for inputting data whether from a look-up list, from a shelf edge marker or from product packaging. Operation of such a system avoids the need to key in numbers via a keyboard, so that printing errors should be reduced.

Where the printer is not intended primarily to print bar codes, a printer having an integral reader, e.g. a bar code reader, can still provide significant benefits. The majority of products in many retail stores are bar-coded by their manufacturers. The code gives an unambiguous identification of the goods concerned, and in order to print (for example) a price label, the product bar code may be used as the input to a price index. Preferably, such a price index is stored in a memory within the printer itself. Such a memory can be up-dated from time to time as required. Thus by reading, for example, a given bar code and actuating the printer, a price label for the product in question can be produced without the need for any alpha-numeric data input. Alternatively, where the printer does not have memory capacity, or does not have sufficient memory capacity, the price for a given goods item may be selected from a look-up table which will generally also contain a bar code or other characteristic data to represent the produce concerned.

The small number of products which are delivered to, for example, a supermarket without manufacturer's bar codes can be bar-coded at goods-in either individually or by addition of one or more bar code labels attached to the box in which the goods are transported. A price code label can then be added to the product later when it is shelved in the supermarket.

Where the portable printer includes or requires memory, this may be provided by one or more plug-in cards —such as the memory card or "smart card" referred to hereinbefore. A series of cards may be used to represent the whole of a store's products arranged according to their nature—different cards, for example, being available for (a) fruit and vegetables, (b) sports wear, and (c) wines and spirits.

For a better understanding of the invention, and to show how the same may be carried into effect, reference will now be made, by way of example, to the accompanying drawings, in which:

FIG. 1 illustrates one embodiment of a hand-held printer incorporating a tracker ball and graphics display;

FIG. 2 illustrates a second embodiment of hand-held printer incorporating a speech recognition unit;

FIG. 3 illustrates a hand-held printer operating in conjunction with a "smart card";

FIG. 4 illustrates a hand-held printer connected to an ancillary bar code reader;

FIG. 5 illustrates a hand-held printer having an integral bar code reader;

FIG. 9 illustrates a modular unit in accordance with this invention; and

FIG. 10 illustrates in cross-sectional view a printing unit suitable for use in the present invention.

Figure 6:
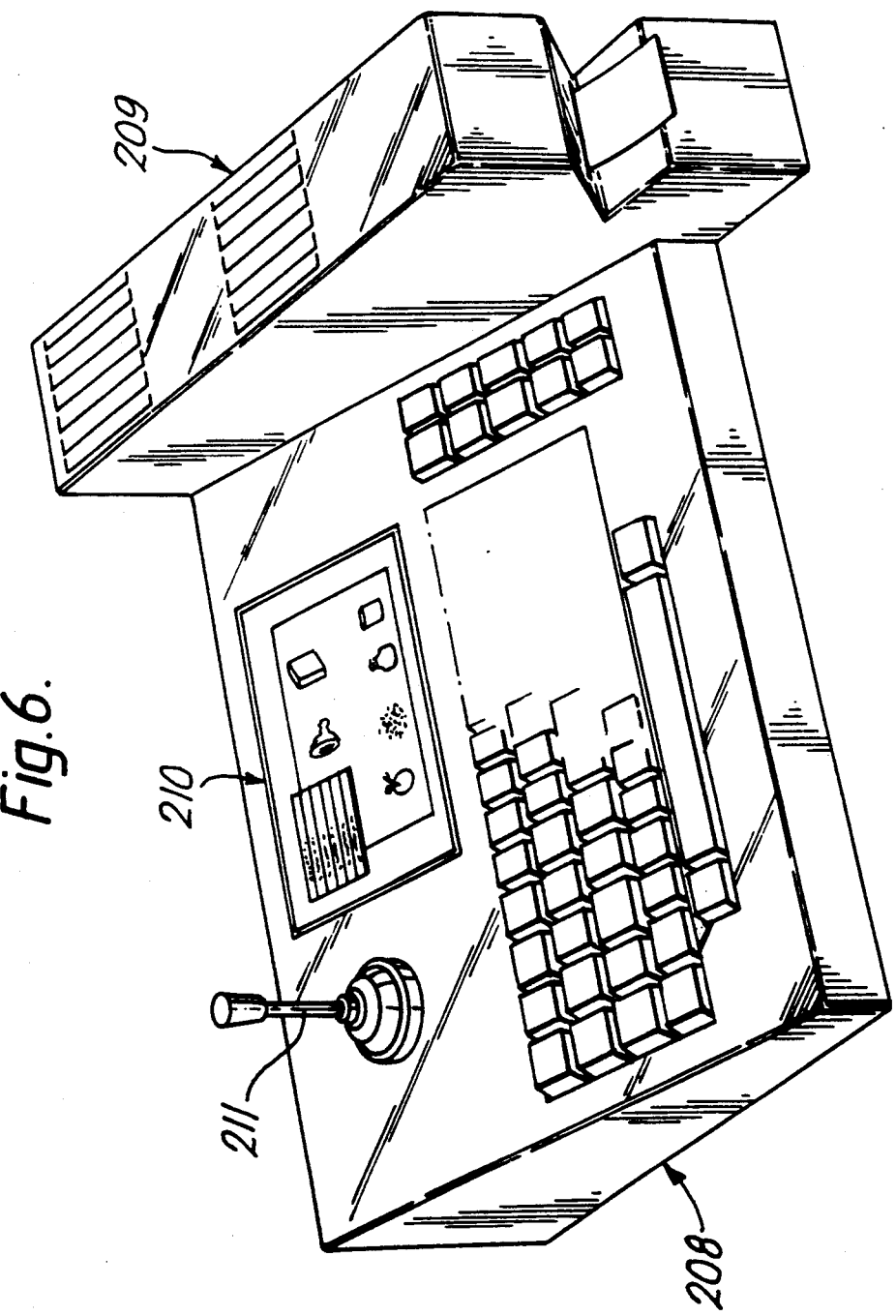
FIG. 6 illustrates a portable printer in accordance with the invention.

Referring now to FIG. 1, a hand-held printer 1 comprises a housing 2 from one end of which a handle 3 extends. On the top face 4 of the housing there is located a tracker ball 5 and a graphics display 6. The screen 6 of the graphics display may be a touch sensitive screen. The precise location of the tracker ball and the graphics display is a matter of design; ergonomic considerations will usually determine whether these integers are located on the top of the housing or elsewhere, for example on the handle 3. Operation of the tracker ball moves a marker 7 through a menu 8 which when one of the listed items is selected determines the items displayed in a sub-display 9. When the appropriate sub-display 9 is located, marker 7 is moved, via operation of tracker ball 5, to indicate the selected item. Selection of an item in this manner can be used to provide an input to an automatic stock control system. After selection of an item, the printing unit of printer 1 is actuated to provide indicia, for example a bar code, on a label which is fed from a roll housed within the printer to a print head, for example a thermographic print head, which generates the required bar code on a label.

In each of FIGS. 2 to 5, the printer is similar in outward form to that shown in FIG. 1 except that there is no tracker ball 5 and no graphics display 6. In FIG. 2, the housing 2 includes on its top surface 4 a microphone 10 which picks up numerical data 11 spoken by an operative 12 and conveys electrical signals corresponding to the spoken data to a speech recognition unit (not shown) within the printer.

FIG. 3 shows a printer having on its top surface 4 a slot 20 designed to receive a smart card 21. The smart card is pre-programmed by means of a portable data entry terminal 22 which includes a slot 23 for a card which is to be programmed, a display panel 24 and an alpha-numeric keyboard 25 for data input.

In FIG. 4, the printer is connected to an ancillary bar code reader 30 via cable 31 and input port 32. A clamp 33 is provided on the side of the housing of the printer to receive and retain the bar code reader 30 when it is not in use.

Referring next to FIG. 5, the printer 1 includes an integral bar code reader 40 mounted on one side thereof. The reader 40 is used to read a bar code 41 provided by the manufacturer on the exterior of a product 42.

FIG. 6 illustrates a portable printer in accordance with this invention. The printer comprises a data input console 208 linked to a printing unit 209. A graphics display unit 210 and a cursor moving device in the form of a joystick 211 are provided on the console 208.

Figure 7:
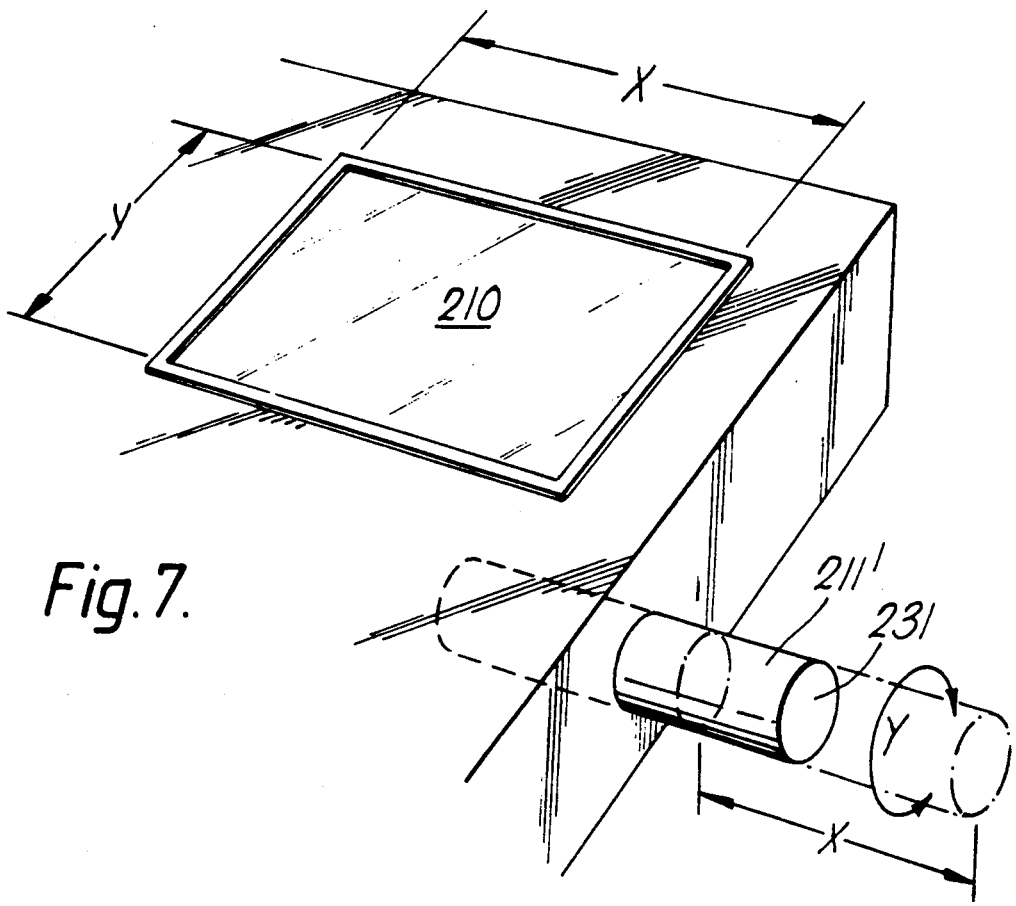
FIG. 7 illustrates an alternative cursor moving means for use in the invention.

In FIG. 7, the cursor moving device 211' is in the form of a rotatable knob 231. Rotation of the knob (arrows Y) moves the cursor of graphics display unit 210 in the Y-coordinate direction, while in/out movement of the knob in the direction of arrows X moves the cursor of the graphics display unit 210 in the X-coordinate direction.

Figure 8:
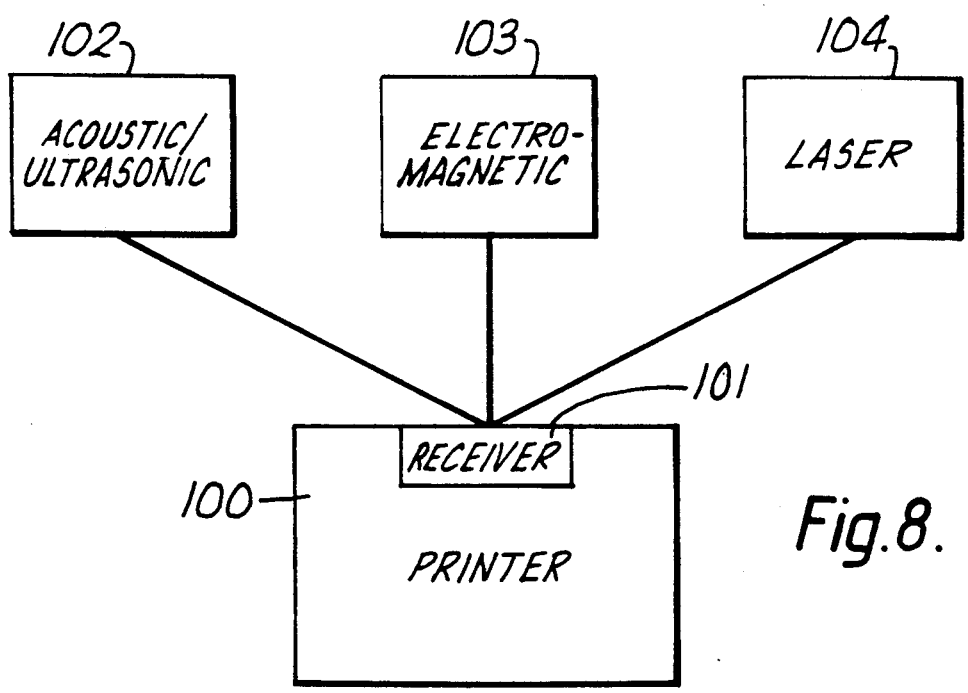
FIG. 8 illustrates schematically alternative data input means.

FIG. 8 illustrates schematically some alternative data input means. Here, the printer 100 includes a receiver 101 which is tuned to respond to appropriate input signals. These may be from an acoustic or ultrasonic source 102, and/or from an electromagnetic source 103, and/or from a laser 104.

FIG. 9 illustrates a modular printing unit which may be used in the present invention. The printing unit comprises a stepper motor 212, a roller 218 driven indirectly by motor 212, a print head 27 adjacent to roller 218 and a take-up spool 228 for a thermal transfer ribbon cassette.

FIG. 10 illustrates a printing unit in cross-section. The unit is located in a housing 211. A label supply roll 57 feeds a strip 54 of labels to print head 27. Stepper motor 212 has a rotary output shaft 213 which drives a roller 214. Slave rollers 215, 216, 217 and 218 are themselves driven by roller 214. This bank of rollers (214-218) is supported by a generally Y-shaped mounting mechanism 219 one arm of which is pivotally mounted at 220. Clockwise rotation about pivot 220 brings the roller 214 into contact with drive 213, and also brings the label strip 54 into contact or near contact with the print head 27 (by the action of roller 218). The course of the label roll 54 towards print head 27 is guided by capstans 220 and 221. A cassette 222 containing thermal transfer ribbon 223 is located about the print head 27. After leaving the print head 27, the substrate 54 moves towards outlet slot 204. Just upstream of this slot, the label backing roll paves over a roller 224 to be wound onto a take-up spool 225. A printed label 56 simultaneously issues from slot 204.

As illustrated in FIG. 10, the cassette 222 fits symmetrically around the print head 27. The cassette 222 may therefore be reversed (in the manner of an audio cassette) if it is of a suitable type. The print head 27 is able to operate as a direct print head, i.e. without the use of ribbon 223, and circuitry 226 is provided to adjust the operating parameters of the print head accordingly.

We claim:

1. A label printer comprising a housing; a printing unit adapted to print labels; means for supplying to said printing unit a substrate onto which indicia are to be printed in order to form said printed labels; and means for inputting data to control the nature of the indicia printed at said printing unit, said means for inputting data being arranged to function without the use of a pre-configured alpha-numeric keyboard and comprising a cursor moving device and a graphics display system, said printing unit, said means for supplying substrate, and said means for inputting data mounted on said housing.

2. A printer as claimed in claim 1 wherein said cursor moving device is a tracker ball.

3. A printer as claimed in claim 1 wherein said cursor moving device is a mouse.

4. A printer as claimed in claim 1 wherein said cursor moving device is a joystick.

5. A printer as claimed in claim 1 wherein said cursor moving device is a rotatable knob mounted on an axially displaceable shaft.

6. A label printer comprising a housing; a printing unit adapted to print labels; means for supplying to said printing unit a substrate onto which indicia are to be printed in order to form said printed labels; and means for inputting data to control the nature of the indicia printed at said printing unit, said means for inputting data comprising a graphics display system having a touch-sensitive screen, said printing unit, said means for supplying substrate, and said means for inputting data mounted on said housing, said label printer being free of any pre-configured alpha-numeric keyboard.

7. A label printer comprising a housing; a printing unit adapted to print labels; means for supplying to said printing unit a substrate onto which indicia are to be printed in order to form said printed labels; and means for inputting data to control the nature of the indicia printed at said printing unit, said means for inputting data comprising an acoustic or ultrasonic source and a speech recognition unit, said printing unit, said means for supplying substrate, and said means for inputting data mounted on said housing.

8. A label printer comprising a housing; a printing unit; means for supplying to said printing unit a substrate onto which indicia are to be printed; and means for inputting data to control the nature of the indicia printed at said printing unit, said means for inputting data comprising a memory card or a "smart card" which is pre-programmed with data, said housing having an aperture therein adapted to removably receive said "smart card".

9. A hand-held bar code label printer which comprises:
- a housing;
- a bar code printing unit mounted in said housing and adapted to print labels;
- handle means secured to said housing;
- means for supplying to said printer unit a substrate onto which indicia are to be printed in order to form said printed labels, said means for supplying substrate being mounted on said housing;
- means for inputting data to control the nature of the bar code indicia printed by said printing unit; and
- said means for inputting data comprising a graphics display system mounted on said hand-held housing and a cursor moving device also mounted on said hand-held housing, said label printer being free of any pre-configured alphanumeric keyboard.

* * * * *

UNITED STATES PATENT AND TRADEMARK OFFICE
CERTIFICATE OF CORRECTION

PATENT NO. : 5,149,211
DATED : September 22, 1992
INVENTOR(S) : Pettigrew, et al.

It is certified that error appears in the above-indentified patent and that said Letters Patent is hereby corrected as shown below:

In column 8, line 3, change "claim 9" to read --claim 10--.

In column 8, line 20, insert the following claim:

10. A printing system which comprises a printer as claimed in claim 8 together with a data entry terminal for programming said memory card or "smart card".

Signed and Sealed this

Fifteenth Day of February, 1994

Attest:

BRUCE LEHMAN

*Attesting Officer*  *Commissioner of Patents and Trademarks*